United States Patent
Rogers

[11] 3,956,015
[45] May 11, 1976

[54] LIGHTWEIGHT NICKEL HYDROGEN CELL

[75] Inventor: Howard H. Rogers, Woodlands Hills, Calif.

[73] Assignee: The United States of America as represented by the Secretary of the Air Force, Washington, D.C.

[22] Filed: June 6, 1975

[21] Appl. No.: 584,566

[52] U.S. Cl. ............................ 136/86 A; 136/134 R
[51] Int. Cl.² ...................... H01M 8/02; H01M 2/00
[58] Field of Search.................. 136/134, 173, 86 A

[56] References Cited
UNITED STATES PATENTS

| | | | |
|---|---|---|---|
| 2,677,713 | 5/1954 | Weil et al. ............................ | 136/36 |
| 3,650,833 | 3/1972 | Sundberg .......................... | 136/36 X |

*Primary Examiner*—T. Tung
*Assistant Examiner*—H. A. Feeley
*Attorney, Agent, or Firm*—Joseph E. Rusz; Robert Kern Duncan

[57] ABSTRACT

A lightweight and improved nickel-hydrogen cell composed of a plurality of parallel connected cell plates is provided by making the conductor leads from each of the plurality of plates to the electrical terminals of the cell have substantially the same electrical resistance, and contain the minimum amount of material.

2 Claims, 12 Drawing Figures

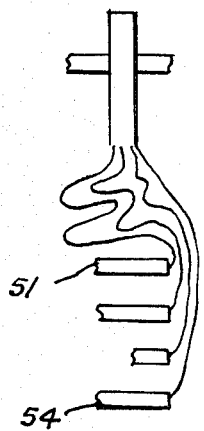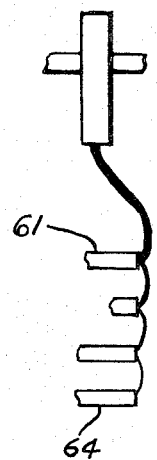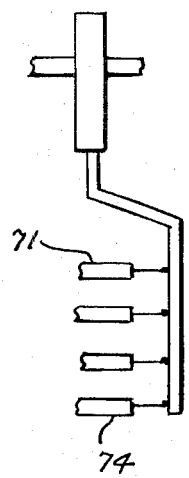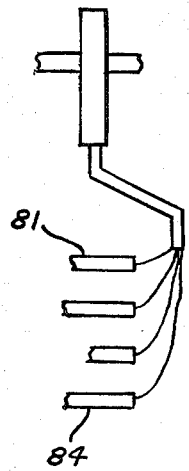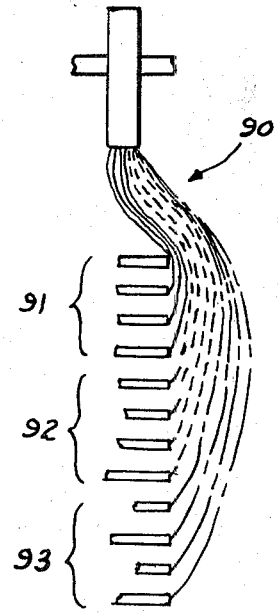

LIGHTWEIGHT NICKEL HYDROGEN CELL

RIGHTS OF THE GOVERNMENT

The invention described herein may be manufactured and used by or for the Government of the United States for all governmental purposes without the payment of any royalty.

BACKGROUND OF THE INVENTION

The field of the invention is in the metal-gas cell and battery art.

The description of the prior art may best be understood by considering a specific example. In a typical, current state of the art, cylindrical 50 ampere-hour nickel-hydrogen cell, the leads which carry the electrical current to and from the plates in the stack to the terminals will be longer for those plates near the bottom of the stack (i.e., those farthest from the terminals) than those leads from the plates near the top of the stack (see FIG. 1). As a result of the different lead lengths, the electrical resistance of the leads going to the lower plates is considerably greater than those of the shorter leads going to the upper plates. The effect of the different resistances is to cause the plates at the top of the stack to deliver more current than the bottom plates during discharge and to receive more current during charge. For example, in a typical manufactured 50 amp-hr Ni-H cell the current imbalance is ± 40% from top to bottom based upon average current. This is quite detrimental to efficient operation of the cell and to cell life. Normally cells are run to a nominal depth of discharge of the whole cell of 80%. This subjects the upper plates to approximately a 100% depth of discharge substantially shortening their life.

An attempt to overcome this variation in lead resistance has been to make the leads of sufficient cross sectional area that the voltage drop in the leads is very low and hence the difference in voltage drop between the long leads and the short leads becomes an insignificantly small value and all the plates substantially discharge and charge the same amount. However, it has been found that to reduce the imbalance to ± 15% that the weight of the leads (for the conventional 50 amp-hr Ni-H cell being described) would be increased 0.12 pounds, and it is very desirable to reduce the percent further to prolong cell cycle life. This increase in weight imposes a large weight penalty on the cell for the majority of its intended useage (space borne devices) and makes it generally unacceptable. Another attempt to cope with this problem has been to make all lead lengths the same, thus all leads would have the same resistance (and the same voltage drop). The excess lead lengths for the shorter distances, i.e., the upper plates, are merely doubled up or folded back on themselves in the upper cavity of the pressure vessel. This solution is likewise generally unacceptable due to the weight penalty involved being substantially as serious as in the previous attempted solution.

The conventional problems of resistance and current carrying capabilities of leads and connections between the plates of storage cells and to the battery terminals are generally old and well known and in general, they have been adequately solved. Examples of such are contained in U.S. Pat. Nos. 2,515,204; 2,677,713; and 3,650,833 to patentees L. Evans, V. Weil et al, and E. Sandberg, respectively. The problems encountered with the relatively new "exotic" batteries and the restrictions placed upon them in their usage in outer space environments are novel. It is in the critical and extremely important areas of weight and cell life with which this invention further advances the art.

SUMMARY OF THE INVENTION

The invention provides a metal-gas secondary cell that has the unique characteristics of being light in weight yet having an optimum (long) cell cycle life. This is achieved by fabricating a cell having the minimum amount of electrical lead material and equal cell plate loads under discharge and charge.

BRIEF DESCRIPTION OF THE DRAWING

FIG. 5 is a schematic representation of having equal lead length to obtain equal voltage drops;

FIG. 6 is a schematic representative of a progressive feeder type of lead arrangement;

FIG. 7 is a schematic representation of a header type of electrical lead system;

FIG. 8 is a schematic representation of a trunk and branch lead system;

FIG. 9 is a schematic representation of an embodiment of the invention having leads of three different materials providing substantially equal average lead resistance for three groups of leads;

DESCRIPTION OF THE PREFERRED EMBODIMENTS

Figure 1:
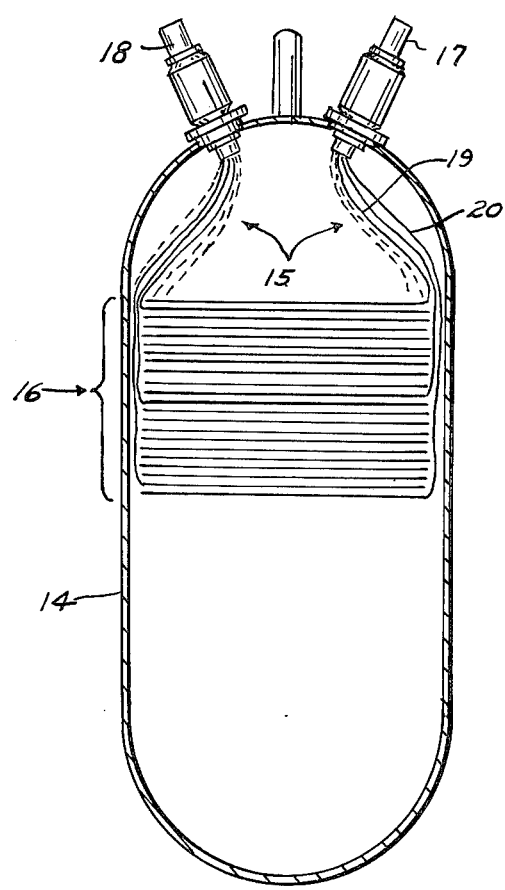
FIG. 1 shows in schematic cross section a typical metal-gas cell.

FIG. 1 illustrates schematically a cross section view of a typical metal-gas cell 14, such as a nickel-hydrogen cell. FIG. 1 is applicable both to embodiments of the present invention and to the prior art in that the invention resides in the leads 15 connecting the cell plates 16 with the terminals 17 and 18 which will be illustrated and described in detail later. Illustrative embodiments of the invention will be described as the invention is incorporated in a conventional 50 amp-hr nickel-hydrogen cell. It is to be understood that the scope of the invention is not limited to this particular cell but is applicable to all cells.

Figure 2:
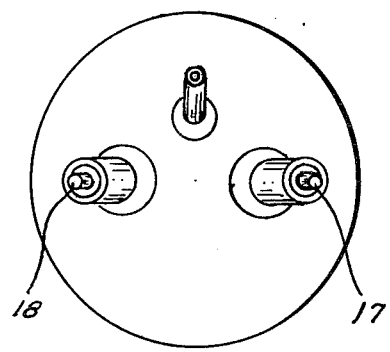
FIG. 2 is a top view of a typical cell as shown in schematic cross section in FIG. 1.

A 50 amp-hr nickel-hydrogen cell as illustrated in FIG. 1 is approximately eight inches long and approximately 3.5 inches in diameter. A typical top view is shown in FIG. 2. Electrical energy is placed in the cell and removed through terminals 17 and 18 (one positive polarity — one negative). The storage plates 16 are conventional, and for the cell current rating being described vary in number from 20 to 25 positive plates and an equal number of negative plates. Each plate has an electrical conductor lead associated therewith connecting it to its respective polarity terminal. Thus, there are approximately 20 leads connected to each of the terminals 18 and 19. (Some cells have all the plates of one polarity directly connected to the pressure vessel and only one separate physical terminal, the other terminal being the case.) The volume of the pressure vessel not occupied by the plates and conductors is used for gas storage.

Figure 3:
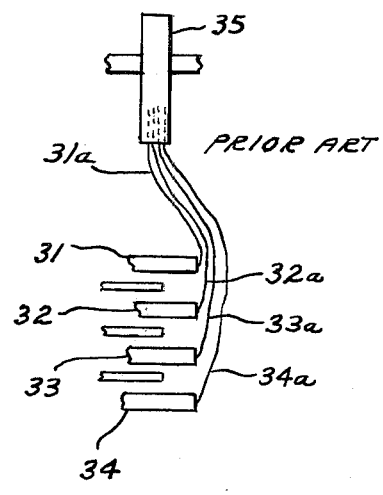
FIG. 3 is a representative schematic diagram showing the prior art connections of cell plates to terminals.

Conventionally, in the prior art devices, the electrical leads connecting the plates with the terminals have been fabricated from insulated nickel wire cut to the appropriate length. This is as illustrated in FIG. 3. Only four plates, 31, 32, 33, and 34 (of the same polarity) are diagrammed with respective connecting leads 31a, 32a, 33a, and 34a, going to terminal 35. In this prior art diagram of FIG. 3 as well as in the following Figures, only a few of the plates are diagrammed, which will be sufficient to set forth the principles involved. It is readily seen that since lead 34a is longer than the others that it will have the most resistance since the conductors are of the same size. Generally, in order to provide as light a weight cell as possible, the lead resistance is calculated to be the maximum resistance (minimum weight of conductor) that will provide the designed operational characteristics, i.e., voltage and current values under charge and discharge conditions. A wire size is then chosen for connecting the plates to the terminals that provides an approximate average value of total parallel lead resistances equal to this calculated value. As previously stated in the "Background", in a typical prior art cell this difference in resistance from the shortest lead such as represented by 31a to the longest as represented by 34a, amounts to a current imbalance of ± 40% from the top plate to the bottom plate of the conventional cell (based upon average current). When the complete cell is discharged to a typical nominal depth of 80% the upper plates are subjected to 100% depth of discharge. This greatly shortens the life of the upper plates and the cell as a whole.

Electrical storage cells such as those with which this invention is concerned are used in very special applications such as space stations, satellites, space probes, and space ships. Generally, cost is not a critical factor, but weight and reliability are very critical factors. Cells such as diagrammed herein are used to provide electrical energy storage from which the energy may be extracted to operate on-board equipment. The operation of the cells is cyclic in that they are used as storage or secondary cells with energy flowing into the cells (such as from solar cells or other electrical generation means) over certain periods of time and then energy is extracted from the cells over scheduled periods of time. The current and voltage requirements of the devices operated by the cells are known. Thus, the average depth of discharge of the cells is established considering the current flow from the cell and the terminal voltage. It is desirable that all cell plates be equally charged when charged and equally discharged when discharged. Due to the differences in lead lengths, in the typical cell being described, the upper lead such as represented by conductor 19 in FIG. 1 and 31a in FIG. 3 is typically approximately 2¼ inches long and the lead to the bottom cell plate as represented by lead 20 in FIG. 1 and 34a in FIG. 3 is approximately 5⅜ inches long, it is apparent that the IR drop in the longest lead will be over twice that of the shortest lead.

Figure 4:
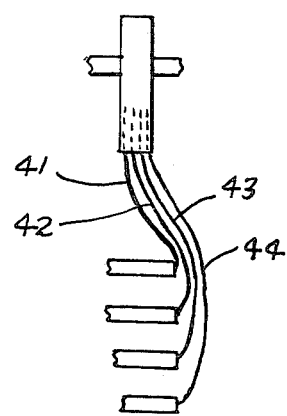
FIG. 4 is a schematic representation of heavy conductor leads to minimize differences in voltage drop.

It is very desirable to achieve a longer cell life than the conventional cells now have and it is equally desirable not to increase the weight of the present cell. FIG. 4 represents one way that the depth of discharge of the plates may be made more nearly equal. It is by making the conductors 41, 42, 43, and 44 out of sufficiently large wires such that the differences in voltage drop in the leads between that of the shortest lead and that of the longest lead is insignificant. This provides for substantially equal charging and discharging of the cell plates, but it is found that in order to achieve this that a very severe weight increase occurs. For example, it was found that to reduce the imbalance to ± 15% the weight increase was 0.12 pounds, an intolerable weight penalty and optimum cell life was still far from that theoretically achievable due to the ± 15% imbalance.

FIG. 5 illustrates another attempt to obtain optimum cell life by making all lead resistances the same by making all leads the same physical length. Optimum cell life is obtained but the added weight penalty is intolerable. FIG. 6 illustrates a progressive feeder type of lead arrangement. Electrically, and weightwise, it represents a compromise. Obviously, the IR drop to the lowest plate 64 will be greater than that to the upper plate 61 but it can be made a quite small difference. Fabrication is the difficulty with this type of lead arrangement. Multiple connections have to be made at the cell plates which is undesirable and it is wasteful of space between the cell plates and the pressure vessel inner wall. FIG. 7 represents a header type of lead system. It does provide substantially equal operation of the cell plates. (However, it is apparent that the IR drop to plate 74 is slightly greater than that to plate 71.) A serious weight penalty is involved, construction is difficult and valuable cell space is utilized inefficiently. FIG. 8 represents an arrangement that does decrease the imbalance of the voltage drop to the cell plates from that of the conventional prior art design, but the decrease is relatively small, construction is difficult and it does have a weight penalty over the prior art devices (i.e., it is heavier).

FIG. 9 illustrates an embodiment of the invention, but not the generally preferred embodiment. In this embodiment, the resistances of the leads 90 are made more nearly equal by using three different grades (alloys) of conductor material. Generally, nickel is the preferred electrical lead material for metal-gas cells due to the environment within the cell. In the illustration shown in FIG. 9, all the plates of one polarity are divided equally into three groups, an upper group 91, a middle group 92, and a lower group 93. Three different conductivities of nickel are used from which to fabricate the leads. Nickel 270 is used for leads going to the lower group of plates 93, nickel 200 for those going to the central group 92, and nickel 211 for the shorter leads going to the upper group of plates 91. The wire size is chosen to provide the required current carrying capabilities and voltage drop compatible with the equipment to which the cell is connected as discussed earlier. While it can be seen that the average voltage drop for each of the three groups may readily be made substantially the same, that the voltage drops within a group of conductors of the same alloy will not be the same, thus, the discharging of the plates will not be to the same level. In addition, there is a small weight penalty connected with the use of the alloys of lower conductivity.

Figure 10:
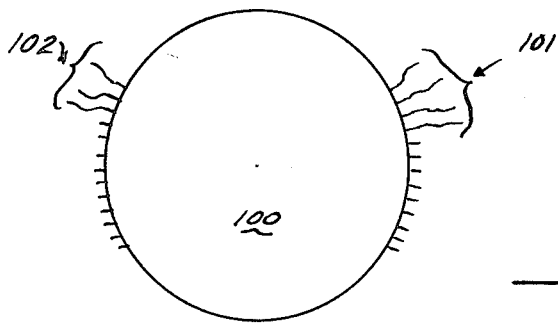
FIG. 10 is a schematic drawing showing representative angular spacing of leads from different plates.

FIG. 10 is presented to illustrate that the cell plates are substantially round and since the individual plates are quite thin, it is quite often desirable to position the plates in the stack so as to bring the leads out from the various plates with a relative angular displacement. FIG. 10 represents looking down on a stack of plates, thus, one sees the upper surface of the top plate 100 and the conductor leads 101 and 102 radiating out from it and the remaining progressively lower plates of the stack. Having an angular displacement to the leads as they come from the plates going to the terminals prevents a lead concentration in one plane along the edges of the plates and a resulting space problem between the edges of the plates and the interior surface of the containing pressure vessel.

Figure 11:
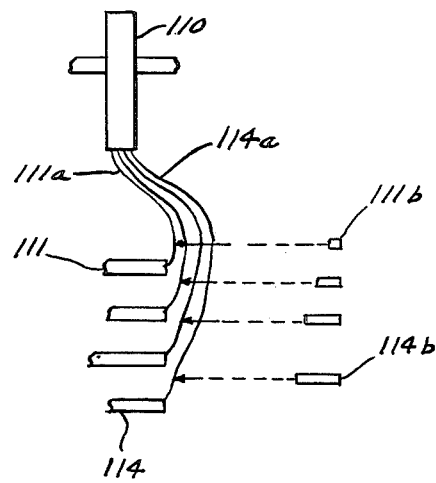
FIG. 11 is a schematic representation of an embodiment of the invention illustrating leads having equal resistivity by varying the cross sectional area of the leads directly with respect to their length.
Figure 12:
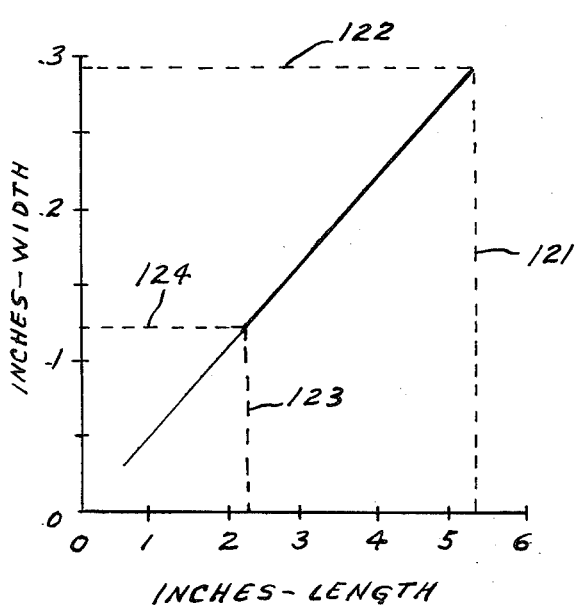
FIG. 12 is a plot illustrating typical lead widths for various lead lengths with equal lead thicknesses.

The preferred embodiment of the invention is schematically illustrated in FIG. 11. In this preferred embodiment there is no weight penalty and equal charge and discharge of all the plates, hence the optimum life of the cell is obtained. This is achieved by varying the cross sectional area of all the leads so that the total lead resistance between the plate and the terminal is identical for all plates. The weight of the leads thus becomes a function of the tolerable voltage drop and current carrying capacity. It is to be observed that the characteristics of the average lead in the conventional prior art may now be the characteristics of each and all the leads. As schematically illustrated in FIG. 11, lead 111a connecting plate 111, the top plate, to terminal 110 has a representative cross section 111b, and lead 114a connecting the bottom plate 114 to terminal 110 has a representative cross section 114b. Generally, it has been found desirable to fabricate the leads from a sheet of material thus the leads will all have the same thickness. The widths of the leads are then varied as schematically illustrated in FIG. 11 so that the resistances of all the leads are the same. In typical embodiments of the invention in otherwise conventional 50 amp-hr cells (as has been described) the leads are fabricated from 0.005 nickel 270 (the highest conductivity alloy). The longest lead going from the terminal to the bottom plate is 5.375 inches long and 0.293 inches wide. The shortest lead going from the top plate to the terminal is 2.25 inches long and 0.122 inches wide. A plot of lead widths vs. lead lengths (for leads of 0.005 thickness) is illustrated in FIG. 12 for this particular embodiment. The widths for the leads between the longest lead length 121 having width 122, and the shortest lead length 123 having width 124 may be found from the corresponding intermediate length positions on the curve. It is to be observed that the resistance provided by this particular combination of lead lengths and lead widths is that resistance resulting from the particular application of the cell and that it is not a fixed value for all cells but will be changed by those practicing this invention according to the particular operational characteristics imposed on the cell. Fabricating the leads as taught herein and illustrated by the preferred embodiment will provide cells with the longest life and lightest weight for their designed application.

In practicing the invention, it is to be observed that indescriminate electrical contact between the leads must be avoided. (Of course, equal potentials exist proportionately along the leads, i.e., the midpoints of all the positive leads will be at the same potential and could without any harm make electrical contact.) It is thus considered necessary to insulate the leads from one another electrically. This is preferably done by placing an insulating oxide layer over the surfaces of the leads. This oxide layer preferably is obtained by conventionally heating the leads in an oxidizing atmosphere. The leads may also be provided with an insulating surface by conventionally anodizing them in an aqueous solution of KOH. An alternative way of providing insulation is to conventionally cover the leads with a plastic insulation which is resistant to the electrolyte of the cell. Typical plastic insulations for cells having KOH electrolyte are FEP or TFE Teflon, Kynar, proyethylene, or polypropylene. Due to the weight penalty involved, these alternatives are not as desirable as the preferred means of insulation. Since the potential differences between different positions on different leads is in the small millivolt range, the insulation requirement is quite simplified, but not eliminated. The electrical leads of this invention are conventionally attached to the cell plates and to the terminals in the same manner as the leads in the prior art (such as by spot welding).

I claim:

1. In a metal-gas cell having a plurality of cell plates of one potential and an electrical terminal to be connected with the said cell plates, the said cell plates being positioned at a plurality of respective separate distances from the said terminal, the improvement comprising:
    a. a plurality of electrical conductive leads in one-to-one relationship connecting the said cell plates to the said terminal, each of the said leads having cross sectional areas varying directly to the length of the said lead, whereby the electrical resistances of all the said leads are of equal value; and
    b. means for electrically insulating each of the said plurality of leads.

2. The said improvement as claimed in claim 1 wherein the said plurality of electrical leads are fabricated of nickel of rectangular cross section and all leads are of equal thickness.

* * * * *